United States Patent
Duckworth

(10) Patent No.: US 10,843,931 B2
(45) Date of Patent: Nov. 24, 2020

(54) METHOD, APPARATUS AND SYSTEM FOR MANUFACTURE OF A CYANIDE

(75) Inventor: Geoffrey Alexander Duckworth, Carindale (AU)

(73) Assignee: SYNERGEN MET LIMITED, Coorparoo (AU)

( * ) Notice: Subject to any disclaimer, the term of this patent is extended or adjusted under 35 U.S.C. 154(b) by 0 days.

(21) Appl. No.: 12/922,104

(22) PCT Filed: Mar. 11, 2009

(86) PCT No.: PCT/AU2009/000288
§ 371 (c)(1),
(2), (4) Date: Sep. 10, 2010

(87) PCT Pub. No.: WO2009/111828
PCT Pub. Date: Sep. 17, 2009

(65) Prior Publication Data
US 2011/0011212 A1    Jan. 20, 2011

(30) Foreign Application Priority Data
Mar. 11, 2008   (AU) ................. 2008901186

(51) Int. Cl.
*C01C 3/10* (2006.01)
*B01J 19/08* (2006.01)
*C01C 3/02* (2006.01)

(52) U.S. Cl.
CPC ............... *C01C 3/10* (2013.01); *B01J 19/088* (2013.01); *C01C 3/025* (2013.01);
(Continued)

(58) Field of Classification Search
None
See application file for complete search history.

(56) References Cited

U.S. PATENT DOCUMENTS

| | | | |
|---|---|---|---|
| 718,112 | A | 1/1903 | Everhard |
| 2,858,261 | A | 10/1958 | Pevere et al. |

(Continued)

FOREIGN PATENT DOCUMENTS

| | | |
|---|---|---|
| DE | 1095798 | 12/1960 |
| EP | 922675 | 6/1999 |

(Continued)

OTHER PUBLICATIONS

Day et al, production of hydrogen cyanide from methane in a nitrogen plasma jet, 1969.*

(Continued)

*Primary Examiner* — Stefanie J Cohen
(74) *Attorney, Agent, or Firm* — Margaret Millikin

(57) ABSTRACT

A method for producing a cyanide including the steps of supplying a hydrocarbon and nitrogen source to an onsite plasma reactor and removing cyanide synthesised inside the onsite plasma reactor to thereby produce the cyanide is disclosed. Also disclosed is a method which includes a monitor for monitoring the cyanide requirement of an onsite cyanide utilising system and supplying the hydrocarbon and nitrogen source in accordance with the cyanide requirement. Additionally, a method for recovering, refining, purifying or treating a metal including the steps of monitoring a cyanide requirement of the method and supplying to the method in a just in time sequence a cyanide synthesised onsite to thereby recover, refine, purify or treat the metal is disclosed.

15 Claims, 5 Drawing Sheets

(52) U.S. Cl.
CPC ............... *B01J 2219/0002* (2013.01); *B01J 2219/00006* (2013.01); *B01J 2219/0883* (2013.01); *B01J 2219/0884* (2013.01); *B01J 2219/0892* (2013.01); *B01J 2219/0894* (2013.01)

(56) References Cited

U.S. PATENT DOCUMENTS

| | | | |
|---|---|---|---|
| 3,370,918 A | 2/1968 | Begley | |
| 3,376,211 A | 4/1968 | Bjornson | |
| 3,674,668 A | 7/1972 | Bjornson et al. | |
| 4,144,444 A | 3/1979 | Dementiev et al. | |
| 5,470,541 A | 12/1995 | Koch et al. | |
| 5,562,132 A * | 10/1996 | Siegele | B01J 4/00 137/209 |
| 5,678,231 A * | 10/1997 | Mouk et al. | 588/1 |
| 5,817,286 A * | 10/1998 | Martin | B01J 8/067 423/375 |
| 2008/0203809 A1* | 8/2008 | Day | C01C 3/0204 299/5 |

FOREIGN PATENT DOCUMENTS

| | | |
|---|---|---|
| GB | 1160490 | 8/1969 |
| WO | 1998/001866 | 1/1998 |

OTHER PUBLICATIONS

Freeman et al, production of hydrogen cyanide from methane in nitrogen plasma jet, 1969.*

Feed forward control, chapter 9, 2004, http://web.archive.org/web/20040210033048/http:/www.bgu.ac.il/chem_eng/pages/Courses/oren%20courses/Chapter_9.pdf.*

Capezutto, Pio et al., "Gas discharges at radiofrequency as chemical reactors. I. Synthesis of hydrogen cyanide from nitrogen and methane at moderate pressures. 1" in Gazzetta Chimica Italiana (1973), 103 (10-12), 1153-68, ISSN: 0016-5603 (in English).

Capezutto, Pio et al., "Gas discharges at radiofrequency as chemical reactors. I. Synthesis of hydrogen cyanide from nitrogen and methane at moderate pressures. 1" in Gazzetta Chimica Italiana (1973), 103 (10-12), 1169-88, ISSN: 0016-5603 (in English).

Amouroux, J., et al., "Calculation of thermodynamic equilibriums at high temperatures in the carbon-hydrogen-nitrogen system with regards to their application in a plasma reactor" in: Annales de Chimie (Paris, France) (1976), 1 (5), 227-38, ISSN: 0151-9107. (See English document listed at #11 in this section).

Rapakoulias D., et al., "Synthesis reactor in nonequilibrium plasma: application to the syntheses of acetylene and hydrogen cyanide" in Revue de Physique Appliquee (1979), 14(12), 961-8; ISSN: 0035-1687. Abstract (Abstract in English).

Freeman, Mark P., et al., "Production of Hydrogen Cyanide from Methane in a Nitrogen Plasma Jet" in American Chemical Society Division of Fuel Chemistry (1967), 11(2), 332-46; ISSN: 0569-3772 Abstract.

Ganz, S.N. et al., "Pyrolisis of Natural Gas in a Nitrogen Plasma" in Khimicheskaya Promyshlennost (Moscow, Russian Federation) (1970), 46(7), 518-21; ISSN: 0023-110X Abstract.

Fraser, Mark E., et al., "Decomposition of Methane in an AC Discharge" in Plasma Chemistry and Plasma Processing, vol. 5, No. 2, 1985 (in English).

Rapakoulias D., et al., "Reacteur de synthese et de trempe dans un plasma hors d'equilibre: application a la synthese de $C_2H_2$ et HCN" in Revue de Physique Appliquee, p. 961 (Dec. 14, 1979). Abstract (Abstract in English).

Rapakoulias D., et al., "Processus catalytiques daps un reacteur a plasma hors d'equilibre: I. Fixation de l'azote dans le systeme NZ-CH4" in Revue Phys. Appl. 15 (1980) 1251-1259. Abstract (Abstract in English).

Amaroux, J. et al., "Calculs Des Equilibres Thermodynamiques a Haute Temperature Dans Le Case Du Systeme C—H—N En Vue De Leurs Applications Dans Un Reacteur a Plasma," Ann. Chim. (1976), t. I, pp. 227-238. #22 (in English).

Amouroux, J., et al., "Etude Experimentale de la Fixation de L'Azote dans un Reacteur a Plasma Haute Frequence in Cas due Systeme CH4-N2"; IUPAC, Paris, France (1977).

Parkhomenko, V. D. et al., "Calculation of the reactor profile for homogeneous plasma-chemical processes" in International Chemical Engineering, vol. 18, No. 1 (Jan. 1978). (in English).

Parkhomenko, V. D. et al., "Thermodynamic Analysis of the N—C—H System" Dnepropetrovsk Chemical Technology Institute (1988) translated from Zhurnal Prikladnoi Khimii, vol. 60, No. 10, pp. 2335-2338 (Oct., 1987). (in English).

Parkhomenko, V. D. et al., "Influence of Mixing Conditions on the Kinetics of High-Temperprture Interaction of Methane With Nitrogen", Journal of Applied Chemistry Ussr, vol. 7, No. 48, pp. 1591-1595 (1975) (in English).

Capezutto, Pio et al., "Gas discharges at radiofrequency as chemical reactors. I. Synthesis of hydrogen cyanide from nitrogen and methane at moderate pressures. 1", Gazzetta Chimica Italiana (1973), 103 (10-12), 1153-68, ISSN: 0016-5603 Abstract. (in English).

Metzger, F.J. "Calcium Cyanide-Powdered Hydrocyanic Acid, A New Product of Manufacture", Industrial and Engineering Chemistry (New York, New York Feb.), p. 1261, Feb. 1926.

Nguyen T.H., "Chemical Weapons Nonproliferation: Confronting New Technological Challenges", Science Magazine, Center for Global Security Research Lawrence Livermore National Laboratory (Livermore, California) (Mar. 4, 2005) UCRL-JRNL-210216.

Harold, M.P., et al., "Process Engineering in the Evolving Chemical Industry", AIChE Journal, Nov. 2000, vol. 46, No. 11, pp. 2123-2127.

Amouroux, J., et al., "Calculs Des Equilibres Thermodynamiques a Haute Temperature Dans Le Cas Du System C—H—N En Vue De Leurs Applications Dans un Reacteur a Plasma", Annales de Chimie (Paris, France) (1976), 1(5), 227-38, ISSN: 0151-9107.

* cited by examiner

METHOD, APPARATUS AND SYSTEM FOR MANUFACTURE OF A CYANIDE

FIELD OF THE INVENTION

The present invention relates to a method, apparatus and system for manufacture of a cyanide. In particular, but not exclusively, the present invention relates to a method, apparatus and system for manufacture of a cyanide using a plasma reactor. The method, apparatus and system may provide cyanide in a just in time sequence and/or may be a small scale end use located device.

BACKGROUND TO THE INVENTION

The current world production of cyanide as a commodity chemical is predominantly via two routes, (1) as a by-product in the production of other chemicals, in particular in the production of acrylonitrile for plastics and resins and (2) by direct manufacture utilising a limited number of licensed chemical processes which are either modern versions of the classical catalytic Andrussow process, the BMA process and the electric arc reactor Shawinigan process. Excluding the use of hydrogen cyanide in the manufacture of plastics, the metals recovery and treatment industry and especially the gold industry is the main cyanide consuming industry.

The traditional industry approach to the manufacture of cyanide is to produce high purity liquid or solid cyanide product in a large scale centralised plant and to distribute this product to end users at their operating locations. Typical capacity of a centralised facility is in excess of 20,000 t.p.a. (tonnes per annum) of sodium cyanide. Centralised production is the normal approach to the manufacture of a commodity chemical product in which economies of scale derived from large facilities offer advantages on plant capital, utilities and raw material costs and these advantages tend to dominate all other costs. In the case of plastics manufacture, these industries are themselves concentrated in large centralised production facilities, often adjacent to the sources of cyanide resulting in a mutual advantage to this approach.

In contrast, cyanide must be shipped over long distances, hostile and rugged terrain, and handled and stored by inexperienced, non specialist transport companies and personnel to remotely located metal recovery and refining sites.

To address these concerns the gold industry has recently developed an International Cyanide Management Code (ICMC) monitored by the International Cyanide Management Institute (ICMI), the purpose of which is to ensure the safe production, transport and handling of cyanide. At the present time, conformance to the code by industry members is voluntary, but as environmental and risk legislation becomes increasingly stringent it is likely that conformance to this code will eventually become mandatory.

Currently cyanide product supplied to the gold industry is in the form of high purity solid sodium cyanide pillows (98% w/w or greater concentration sodium cyanide) or where transport economics permit, liquid sodium cyanide solution (30% w/w or greater concentration sodium cyanide). These materials are stored in significant quantities at the end-user's site (entailing significant risk), to accommodate disruption of supply and are dissolved or diluted to typically 10% w/w solutions for use in the metal recovery process. The high purity cyanide products are produced and shipped by the manufacturers for several reasons including: (1) to minimise product decomposition, which is promoted by the presence of various impurities, (2) to minimise transport cost and (3) for general use that includes specialty applications such as high purity metals refining and surface treatment.

The Shawinigan process is currently the only commercial uncatalysed thermal plasma process for the production of cyanide. This process is a high temperature disruptive thermal plasma process in which the endothermic heat of reaction is supplied by heating the reaction gases directly with an electric arc immersed in a fluidised bed of coke. Bulk gas phase temperatures in the reactor are typically 1200° C. to 1500° C. The product gases must then be rapidly cooled to less than 300° C. to maximise the yield of hydrogen cyanide. The reaction process is kinetically controlled producing hydrogen cyanide gas concentrations at orders of magnitude higher than would otherwise be obtained at thermodynamic equilibrium. The calculated concentration of hydrogen cyanide at equilibrium under these conditions is approximately 0.3 mol %, but actual measured hydrogen cyanide concentrations are approximately 20 mol %. Consequently the sooner the product gas can be quenched the higher the yield of hydrogen cyanide obtained. The need to separate coke and synthesis gas in the Shawinigan process delays gas quenching with adverse effects on cyanide yield. In addition the requirement for a fluidised bed of coke and the need to supply and remove coke from the reactor with the attendant coke and/or gas separation, results in a reaction system which is complex and expensive to build and operate. The complexity of the Shawinigan reaction system is undesirable and increases cost.

The reactions occurring in the above processes proceed at elevated temperature, are highly endothermic and supplying the required heat under these conditions is a major challenge.

US patents do not constitute common general knowledge in Australia or other countries. Any discussion of the prior art throughout the specification should in no way be considered as an admission that such prior art is widely known or forms part of the common general knowledge in the field.

OBJECT OF THE INVENTION

Broadly, the invention relates to a method, apparatus and system for producing a cyanide. A preferred object is to provide a method, apparatus and system for producing a cyanide onsite.

It is a preferred object of this invention to overcome or alleviate one or more of the above disadvantages of the prior art and/or provide the consumer with a useful or commercial choice.

Further preferred objects will be evident from the following description

SUMMARY OF THE INVENTION

The invention relates to the use of a plasma reactor for the production of cyanide. Advantageously, the cyanide produced may be used for direct end use from an onsite production unit. The cyanide may be provided just in time to satisfy usage. Of significant advantage, the invention may provide a means whereby the mineral and metals industry can meet the requirements of the ICMC in a safe and cost effective manner.

In a first aspect, although it need not be the only, or indeed the broadest aspect, the invention resides in a method for producing a cyanide including the steps of:

supplying a hydrocarbon and nitrogen source to an onsite plasma reactor; and removing cyanide synthesised inside the onsite plasma reactor to thereby produce the cyanide.

In a second aspect the invention resides in an onsite apparatus for producing a cyanide comprising:

an onsite reaction chamber into which a hydrocarbon and a nitrogen source are fed; and an onsite plasma reactor to dissociate the hydrocarbon and nitrogen source in the reaction chamber into active radicals to produce the cyanide.

In a third aspect the invention resides in an onsite system for producing a cyanide comprising:

an onsite reaction chamber for reacting the hydrocarbon and the nitrogen source with an onsite plasma; and an onsite plasma reactor for dissociating the hydrocarbon and nitrogen source into active radicals to produce the cyanide.

In a fourth aspect the invention resides in a method for producing a cyanide including the steps of:

monitoring a cyanide requirement of an onsite cyanide utilising system;

supplying a hydrocarbon and nitrogen source to an onsite plasma reactor in accordance with the cyanide requirement; and removing cyanide synthesised inside the onsite plasma reactor to thereby produce the cyanide for supply to the onsite cyanide utilising system.

In a fifth aspect the invention resides in an onsite apparatus for producing a cyanide comprising:

a monitor for monitoring a cyanide requirement of an onsite cyanide utilising system;

an onsite reaction chamber into which a hydrocarbon and a nitrogen source are fed in accordance with the cyanide requirement; and an onsite plasma reactor to dissociate the hydrocarbon and nitrogen source in the reaction chamber into active radicals such that the cyanide is synthesised for supply to the onsite cyanide utilising system.

The cyanide may be synthesised in accordance with the cyanide requirement.

In a sixth aspect the invention resides in an onsite system for producing a cyanide comprising:

a monitor for monitoring cyanide requirement of a cyanide utilising system;

an onsite reaction chamber for reacting the hydrocarbon and the nitrogen source with an onsite plasma; and an onsite plasma reactor for dissociating the hydrocarbon and nitrogen source into active radicals to produce the cyanide for supply to the cyanide utilising system.

The system according to the third aspect and the sixth aspect may further comprise an onsite supply for supplying a hydrocarbon and a nitrogen source.

In a seventh aspect the invention resides in an onsite method for recovering, refining, purifying or treating a metal including the steps of:

monitoring a cyanide requirement of the onsite method;

supplying to the method in a just in time sequence a cyanide synthesised onsite to thereby recover, refine, purify or treat the metal.

In an eighth aspect the invention resides in an onsite apparatus for recovering, refining, purifying or treating a metal comprising:

a monitor to monitor a cyanide requirement of the onsite apparatus; and an onsite cyanide production apparatus to supply cyanide to the onsite apparatus in a just in time sequence as determined by the monitoring of the cyanide requirement of the onsite apparatus.

In a ninth aspect the invention resides in an onsite system for recovering, refining, purifying or treating a metal comprising:

a monitor to monitor a cyanide requirement of the onsite system; and an onsite cyanide production apparatus to supply cyanide to the onsite system in a just in time sequence as determined by the monitoring of the cyanide requirement of the onsite system.

The monitoring according to any one of the fourth, fifth, sixth, seventh, eighth or ninth aspects may produce cyanide requirement data.

According to any to any one of the first, second, third, fourth, fifth or sixth aspects the supply of the cyanide may be in a just in time sequence in accordance with the cyanide requirement.

The dissociating according to any of the above aspects may be in a just in time sequence in accordance with the cyanide requirement.

The onsite cyanide production apparatus according to either of the eighth or ninth aspects may be a plasma reactor.

The metal according to any one of the seventh, eighth or ninth aspects may be gold.

The cyanide utilising system according to any one of the fourth, fifth or sixth aspect may be a gold mill.

According to any one of the above aspects the distance between an arc and the hydrocarbon source addition point may be in the range of 5 to 15 mm.

According to any one of the above aspects the bulk gas temperature may be in a range of 1000 to 1600° C.

According to any one of the above aspects the molar ratio of the hydrocarbon and nitrogen source may be between 2.5 and 3.0.

According to any one of the above aspects the plasma reactor may be a cold plasma reactor or a thermal plasma reactor.

In a tenth aspect the invention resides in method of modifying a thermal plasma waste destruction apparatus into an apparatus for performing the method of the first, fourth and/or seventh methods, into the apparatus of the second, fifth and/or eight aspects and/or into the system of the third, sixth and/or ninth aspects.

According to any of the above aspects onsite refers to accomplished or located at the site of the particular activity that requires cyanide.

Further features of the present invention will become apparent from the following detailed description.

In this specification, the terms "comprises", "comprising" or similar terms are intended to mean a non-exclusive inclusion, such that a method, system or apparatus that comprises a list of elements does not include those elements solely, but may well include other elements not listed.

BRIEF DESCRIPTION OF THE DRAWINGS

In order that the present invention may be readily understood and put into practical effect, reference will now be made to the accompanying illustrations wherein like reference numerals are used to refer to like elements and wherein.

DETAILED DESCRIPTION OF THE INVENTION

Figure 1B:
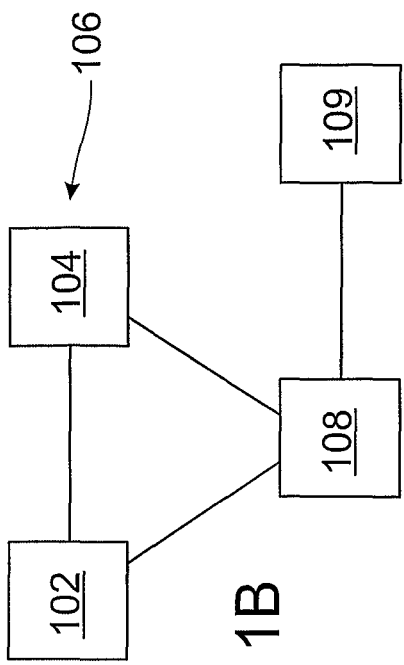
FIG. 1B is schematic diagram showing another embodiment of the apparatus of the invention.

The present invention relates to the use of a plasma and/or a plasma reactor for the manufacture of a cyanide.

The present inventors have recognised that in the metals recovery and refining industry, and in particular the gold industry, operation sites are widely dispersed around the world, often located in remote and isolated regions and often with small to modest consumption of cyanide at the specific operating sites. Consequently the risk of accidents, accidental release impacting on communities and the environment or illegal action by criminal elements and terrorists is a constant concern.

Further, the present inventors have recognised that typical annual cyanide consumption at a gold mill is relatively low, varying from less than 100 t.p.a. of sodium cyanide per year to over 2000 t.p.a. depending upon the size of the mill. A gold mill consuming approximately 500 t.p.a. of sodium cyanide is considered of average size.

Moreover, in reality high purity, high concentration cyanide product is not a technical requirement for end use in the majority of the gold industry, but to produce it, significant capital and operating costs must be expended by the manufacturer. This results in an additional and unnecessary cost burden that must be borne by the end users.

In addition to recognising this problem the inventors have provided a novel and inventive solution, which is, to manufacture cyanide onsite.

By onsite is meant accomplished or located at the site of the particular activity that requires cyanide.

Because the cyanide is manufactured onsite it may be applied to a direct end use. The direct end use may be a just in time sequence in accordance with cyanide requirements.

Suitably, the cyanide may be manufactured onsite in such a manner that the requirement for the transportation, intermediate storage, and handling and dissolution of large quantities of high concentrations of cyanide is removed or reduced. By eliminating the need to transport, handle and store large quantities of cyanide this invention makes a major contribution towards the protection of communities, workers and the environment in accordance with the intent of the ICMC.

The cyanide may be in any form or phase. For example the cyanide may be a hydrogen cyanide, a calcium cyanide, a sodium cyanide and/or a basic cyanide salt. The cyanide may be a gas, a liquid, a solution or a solid. The cyanide may be a solution or a mixture with other materials, e.g. lime. Suitably the cyanide may be an aqueous solution of a cyanide salt in water.

The cyanide produced may be used in any suitable industry. One example of a suitable industry is the gold industry. A person of skill in the art is able to select other suitable industries.

The invention may utilise a plasma process to produce cyanide from a raw material source or feed stock. The plasma process causes the raw material source or feedstock to react to produce the cyanide.

The raw material source or feed stock may contain a hydrocarbon and a nitrogen source or feedstock.

The hydrocarbon source or feedstock may be a pure hydrocarbon, an impure hydrocarbon or a mixture thereof. A pure hydrocarbon is composed entirely of carbon and hydrogen. An impure hydrocarbon is composed of carbon and hydrogen with bonded compounds and/or impurities such as, sulphur and/or nitrogen. Suitably, the hydrocarbon is predominantly composed of hydrogen and carbon. Examples of suitable hydrocarbons are methane, natural gas, ethane, propane, butane, liquefied petroleum gas (LPG) and naphtha. Preferably the hydrocarbon is propane and/or LPG.

The nitrogen source or feedstock may be nitrogen from air and/or ammonia. Suitably, the nitrogen source is predominantly composed of nitrogen and hydrogen. Preferably the nitrogen feedstock is nitrogen gas ($N_2$) and/or ammonia ($NH3$).

The use of nitrogen directly instead of ammonia for the synthesis of hydrogen cyanide has been shown to be feasible. A higher level of power consumption may be required to dissociate nitrogen gas into active radicals. Nitrogen is a more stable molecule than ammonia under plasma conditions and consequently the activation energy may be higher. The required nitrogen may be purchased and transported onsite. Alternatively, nitrogen may be produced onsite. Suitable methods for production of nitrogen onsite include Pressure Swing Absorption (PSA) and membrane filtration. When onsite separation of nitrogen from air is used as the source of nitrogen, the need for transportation of either ammonia or nitrogen is advantageously eliminated.

The molar ratio of the nitrogen source and the hydrocarbon source may be between 1.5 and 4.5. The molar ration may be 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9 or 4.0. Suitably, the molar ratio is between 2.5 and 3.0. More suitably the molar ratio is 2.8.

The nitrogen source and/or the hydrocarbon source may be used alone or carried with a suitable carrier gas such as argon and/or helium.

One or more activating chemicals may be used to increase the production of active radicals. The one or more activating chemicals may be present in a trace amount. One suitable activating chemical is sulfur hexafluoride ($SF_6$).

Typical overall chemical reactions occurring in the method are:

(1) hydrocarbon+nitrogen source→HCN;

(2) from propane and nitrogen as feed materials:

$$2C_3H_8+3N_2 \rightarrow 6HCN+5H_2$$

(2) with methane and ammonia as feed materials:

$$CH_4+NH_3 \rightarrow HCN+3H_2$$

(2) with propane and ammonia as feed materials:

$$C_3H_8+3NH_3 \rightarrow 3HCN+7H_2$$

(3) with butane and ammonia as feed materials:

$$C_4H_{10}+4NH_3 \rightarrow 4HCN+9H_2$$

(4) with methane and nitrogen as feed materials:

$2CH_4 + N_2 \rightarrow 2HCN + 3H_2$

A person of skill in the art is readily able to write analogous reactions for other hydrocarbon sources with ammonia and/or nitrogen.

A plasma may be formed via the application of an electric field of sufficient magnitude to a gas, to induce gas molecule ionization and electrical conduction with the appearance of a gas discharge.

The plasma may be a thermal plasma or a cold plasma. Thermal plasmas may be characterised by a predominant thermodynamic equilibrium between the plasma species. The thermal plasma may be a high temperature disruptive thermal plasma. Cold plasmas may have a strong disequilibrium between the temperatures of the electrons and the temperatures of the other species. The cold plasma may be a non-disruptive cold plasmas or corona.

Of significant advantage is that compared to conventional reactors utilised for cyanide manufacture plasma units are particularly suited to small scale, unattended and/or limited attendance modular design.

Chemical activation in a gas discharge may be ascribed to thermal excitation of electrons. While the electron temperature in a gas discharge may be high, it is not necessary for the gas bulk temperature to be high. A discharge in which high localised current flow takes place may be disruptive in the region of the discharge itself, e.g. high current arcs may exhibit thermal properties at high pressures. Non-disruptive plasmas, on the other hand, may be more diffuse with relatively low current flow proceeding over the whole discharge gap.

Significantly, testwork has shown that hydrogen cyanide may be generated in either thermal or cold plasmas. Theoretically, the formation of hydrogen cyanide from gas mixtures is favoured by gas temperatures around 3000° C. This temperature is well below those achieved in an electric arc and it is readily achieved in the bulk gas phase of thermal plasmas and is significantly higher than the temperature achieved in cold plasmas. However, as with many industrial processes it is apparent that the yield of hydrogen cyanide obtained is predominantly determined by reaction kinetics and that thermodynamic equilibrium conditions are not strictly relevant.

The past three decades have seen significant advances in the development of plasma torches for various applications. Typically a commercial plasma torch requires electric power which is applied across a collinear electrode assembly producing an electric arc which causes a low pressure injected gas stream to be ionised forming a high temperature plasma.

Plasma torches have been employed for high temperature destruction of toxic wastes and modular transportable units have been constructed with 350 kW, 750 kW and 1500 kW plasma torches. Plasma torches are available as "off the shelf" units with power demands of up to 3000 kW. Such units can be readily adapted to the production of cyanide, e.g. a 350 kW unit would be capable of producing in excess of 500 t.p.a. of equivalent sodium cyanide.

The high temperature electric arc may be able to achieve a temperature greater than 1200° C.

The bulk gas temperature may be in a range of 800 to 2000° C. The bulk gas temperature may be 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950 or 2000° C. Suitably, the bulk gas temperature in the in range of 1000 to 1600° C. Preferably the bulk gas temperature is in the range of 1200 to 1400 C°.

The nitrogen source carrier gas and/or the nitrogen source may be passed through the arc.

The invention may include a provision for the handling of fine soot generation. A person of skill in the art is readily able to provide suitable provisions for handling soot generation.

The hydrocarbon source may be added to the high temperature gas immediately after the arc. Advantageously, this minimises soot production.

To further minimise soot production the distance between the plasma arc and the hydrocarbon source addition point to the plasma may be a distance in the range of 5 to 15 mm. The addition point may be 5, 6, 7, 8, 9, 10, 11, 12, 13, 14 or 15 mm. Suitably, the addition point is in the range of 8 to 12 mm. More suitably, the addition point is 10 mm.

Operating pressure may be in the range 1.5 barg to 30 barg or higher. The operating pressure may be 1.5, 2.0, 2.5, 3.0, 3.5, 4.0; 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, or 30 barg. Suitably, operating pressure is in the range of 5.0 to 25 barg.

Cold plasmas have some potential advantages over thermal plasmas for the production of hydrogen cyanide. Firstly, lower bulk gas temperatures may be employed which reduces the amount of gas quenching required and minimises thermal decomposition of the product. Secondly, the amount of electrical energy required may be reduced to that required to drive the reaction which minimises that wasted in thermal losses.

Kinetic mechanisms for the formation of hydrogen cyanide in both thermal and cold plasmas have been proposed, for example in cold plasmas Capezzuto et al. (Gazzetta Chimica Italiana 103, 1973 pp 1153-1189) proposed:

$$\frac{d[HCN]}{dt} = k_1[N][C_2H_2] + k_2[N] - k_3[HCN]$$

According to this rate equation, the formation of hydrogen cyanide goes via an intermediate step involving the formation of acetylene.

After plasma contact but before gas quenching a catalyst may be used to reduce the required power input. Suitable catalysts include platinum, iron and alumina catalysts which may reduce the required power input to around half that required by the Shawinigan process.

Cyanide may be removed from the synthesis gas as soon as it is formed to maximise the rate of formation of hydrogen cyanide. This removal may be achieved by utilising the high boiling temperature of hydrogen cyanide (26° C. at 1 atm). In which case, separation may be possible by cooling the reactor wall to the liquefaction temperature whereby liquid hydrogen cyanide will condense and may be separated from the plasma gas. By adjusting conditions at the reactor wall to promote the formation and liquefaction of HCN the yields of hydrogen cyanide can be significantly improved. The removal may also be achieved by reacting the acidic cyanide gas with an alkali. Efficient separation from the plasma gas may thus be achieved by neutralising the acid gas in an appropriate alkaline solution.

Generated cyanide may be neutralised by reaction with a solution of a caustic soda. The cyanide produced may be a liquid sodium cyanide solution. The cyanide may be used for controlled dosing into mill pulp solutions. The caustic soda may be a technical grade caustic soda solution, such as 50% w/w NaOH. Other sources and lower concentrations of caustic soda may be used.

Alkaline mill pulps and slaked lime solutions may be used to produce impure solutions of sodium or calcium cyanide. Suitably, allowance is made to accommodate the presence of solids and/or the scaling nature of the solution.

The overall chemical reaction for the neutralisation of hydrogen cyanide with caustic soda may be written as:

$$HCN + NaOH \rightarrow NaCN + H_2O.$$

The cyanide may also be neutralised with lime solutions. For example the neutralisation may be performed according to the following equation:

$$2HCN + CaO \rightarrow Ca(CN)_2 + H_2O$$

After neutralisation the synthesis gas may be recycled to the plasma torch to maximise utilisation of the raw materials.

Hydrogen, the main by-product from the reaction, can be withdrawn from the recycled synthesis gas and burned as a fuel to generate steam and/or electric power.

If the plasma torch is operated at sufficient pressure, the pressure can be let down through a hot gas expander generating electric power, prior to temperature quench. This may be advantageous, where for example natural gas is supplied to the site at significant pressures.

The cyanide may be produced in accordance with the cyanide requirement of a cyanide utilising system. The cyanide utilising system may be onsite and may be any system utilising cyanide. Non-limiting examples of a cyanide utilising system include a gold mill and a plastics manufacturing facility. Suitably, the cyanide utilising system is a gold mill.

The invention also provides an onsite method, apparatus and/or system for recovering, refining, purifying or treating a metal.

It is to be understood that recovering, refining, purifying or treating are relative terms and any step that increases purity by any amount is considered a recovery, refinement, purification or treatment.

The cyanide requirement may be monitored by any suitable monitor. In one embodiment the cyanide requirement is monitored by an indicator of cyanide storage levels. The indicator may be an indicating line in a store such that once the cyanide level drops below the line more cyanide is required. In another embodiment cyanide requirement is monitored electronically and stored in a database. The database may store and contain cyanide requirement data.

The cyanide requirement data may be produce and stored to be used to determine cyanide requirement such as in accordance with a just in time sequence.

The cyanide may be produced as determined by feed-forward regulation. In one embodiment the cyanide concentration in the cyanide produced is conveniently determined by online titration, which enables the user to develop feed-forward control of cyanide produced. As opposed to the current practice of feedback control from mill pulp concentrations, feed-forward control enhances the ability to cost effectively control cyanide dosage rates.

Feed-forward control of cyanide also enables the maintaining of an absolute minimum inventory of cyanide product onsite, which minimises the danger of accidental release and consequential hazard and risk to personnel and the environment.

The onsite nature of the activity also provides the end user with the flexibility to use the most cost effective neutralising agents at any particular time, e.g. caustic soda, lime or magnesia depending upon cost of supply to the mill.

By just in time sequence is meant a supply sequence such that storage of cyanide is reduced or minimised. The just in time sequence may be to begin or commence production once onsite cyanide storage levels drop below a determined level.

The hydrocarbon and/or nitrogen source may be supplied to the onsite plasma reactor in accordance with the cyanide requirement. By in accordance with the cyanide requirement is meant to provide sufficient raw material to produce a required amount of cyanide. The required amount may be determined by a just in time sequence.

The reaction of the hydrocarbon and the nitrogen source may be in accordance with the cyanide requirement. By in accordance with the cyanide requirement is meant to provide sufficient raw material to produce a required amount of cyanide. The required amount may be determined by a just in time sequence.

The dissociation of the hydrocarbon and nitrogen source into active radicals may be in accordance with the cyanide requirement. By in accordance is meant to provide sufficient cyanide to the cyanide utilising system. The required amount may be determined by a just in time sequence.

The cyanide may be synthesised in accordance with the cyanide requirement of the cyanide utilising system. By in accordance is meant to provide sufficient cyanide to the cyanide utilising system. The required amount may be determined by a just in time sequence.

The metal may be any metal being refined, recovered, purified or treated using cyanide. Suitably, the metal is gold.

The cyanide utilising system may be any system that utilises cyanide. Suitably, the cyanide utilising system may be a gold mill.

Figure 1A:
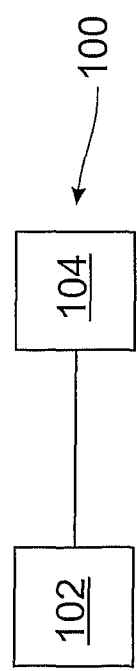
FIG. 1A is a schematic diagram showing one embodiment of the apparatus of the invention.

FIG. 1A shows one embodiment of an onsite apparatus 100 according to the invention including a reaction chamber 102 into which the hydrocarbon and nitrogen source are fed to a plasma torch 104.

FIG. 1B shows another embodiment of an onsite apparatus 106 according to the invention including a monitor 108 which monitors the cyanide requirements. Monitor 108 monitors the cyanide requirements of an onsite cyanide utilising system 109.

In the embodiment shown in FIG. 1B monitor 108 is in communication with both reaction chamber 102 and plasma torch 104. In other embodiments monitor 108 is in communication with only one of reaction chamber 102 or plasma torch 104 or with none of reaction chamber 102 or plasma torch 104.

In other embodiments monitor 108 monitors the cyanide requirement of an onsite method, apparatus and/or system for recovering, refining, purifying or treating a metal.

Figure 2B:
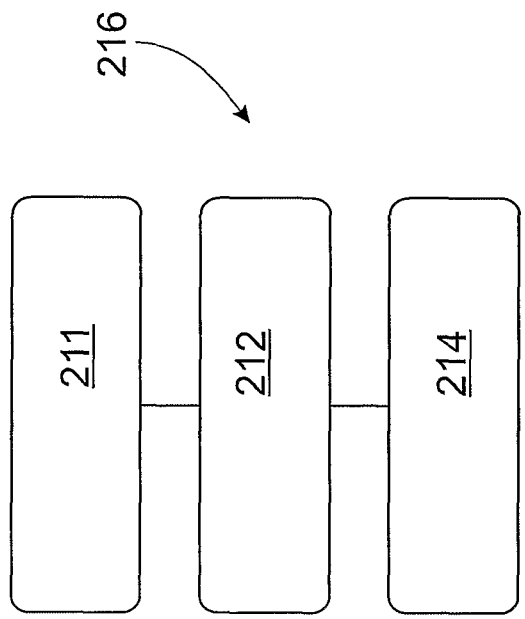
FIG. 2B is a flowchart showing another embodiment of the method of the invention.
Figure 2A:
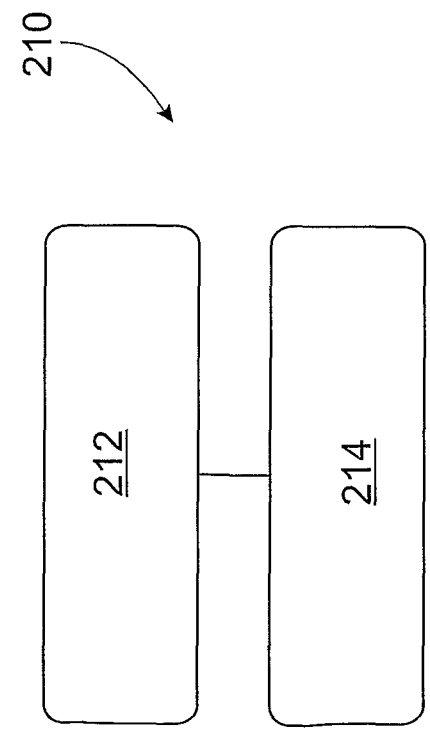
FIG. 2A is a flowchart showing one embodiment of the method of the invention.

FIG. 2A shows one embodiment of the method 210 of the invention in which at step 212 the hydrocarbon and nitrogen source are supplied to an onsite plasma reactor and at step 214 cyanide synthesised inside the onsite plasma reactor is removed to thereby produce the cyanide.

FIG. 2B shows another embodiment of the method 216 of the invention in which at step 211 the cyanide requirement of an onsite cyanide utilising system is monitored.

In another embodiment at step 211 the cyanide requirement of an onsite method, apparatus and/or system for recovering, refining, purifying or treating a metal is monitored.

The apparatus and system may be modular. By modular is meant that various functional components are implemented in removable modules that when inserted into position provide certain functionality.

The apparatus and system may be mobile. By mobile is meant that it is capable of being transported or conveyed. The transportation or conveyance may be achieved by attaching the apparatus or system to a transport device such as a truck, train or ship.

So that the invention may be readily understood and put into practical effect, the following non-limiting Examples are provided.

EXAMPLES

Example 1

Figure 3:
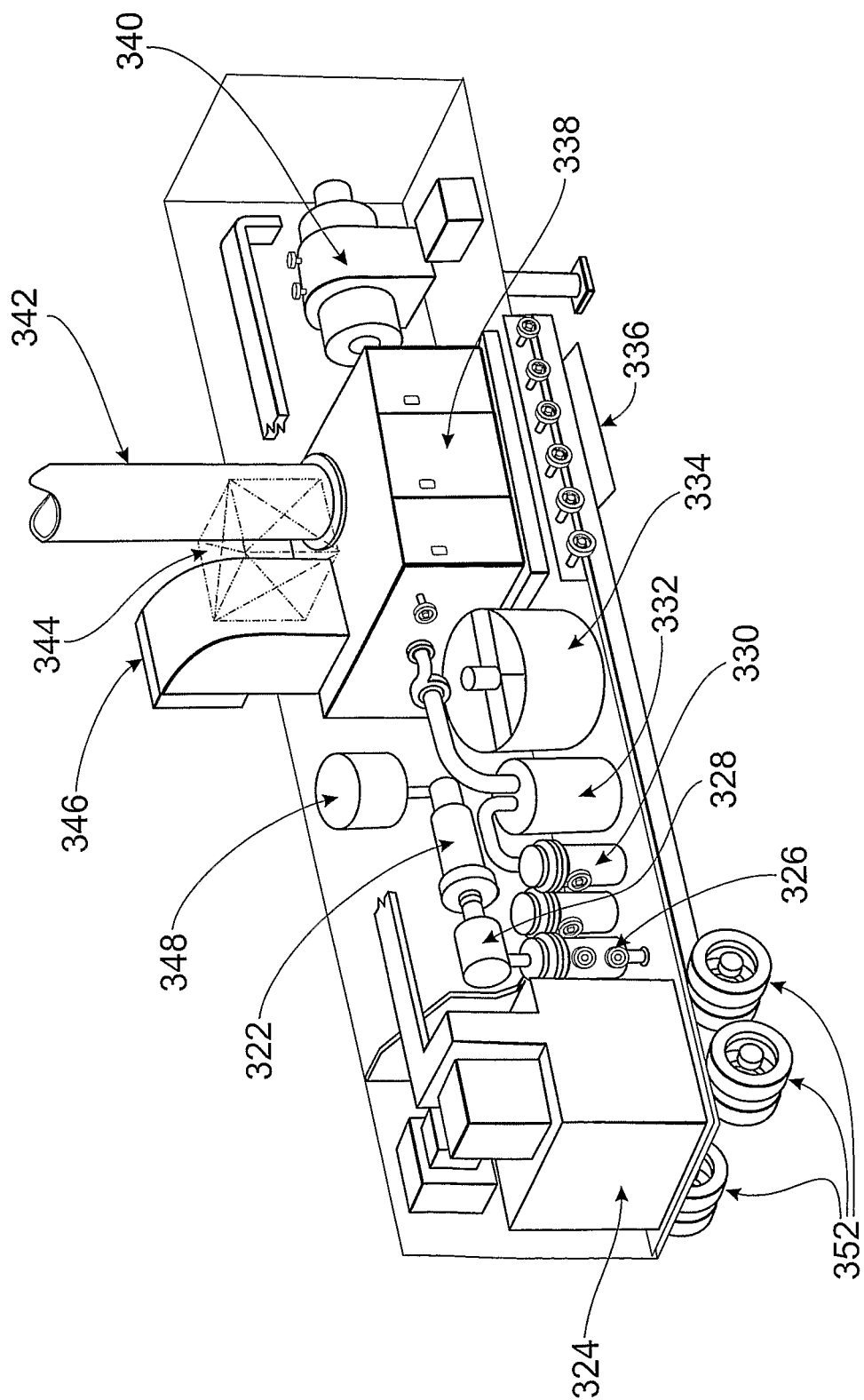
FIG. 3 shows a schematic diagram showing another embodiment of the apparatus of the invention using a thermal plasma configuration.

FIG. 3 shows a schematic diagram of an embodiment of an apparatus 320 of the invention including a thermal plasma torch 322. In this embodiment raw materials of natural gas and ammonia or nitrogen are supplied into reaction chamber 328 where a plasma generated by plasma torch 322 ionises the components of the gases.

The apparatus 320 also includes a power unit transformer 324 and a gas cooler 326.

To neutralise the exhaust gas the apparatus 320 is provided with a soot filter 330 and an alkali solution scrubber 332.

Alkali solution for reaction with synthesised cyanide gas is stored in the alkali solution buffer tank 334.

Apparatus 320 further includes raw material battery limits 336, gas turbine 338, generator 340, cooler and vent tank 344, air inlet 346 and scrubber emergency stock tank 348.

The generation of active nitrogen radicals from the nitrogen source in the plasma is promoted by dosing the synthesis gas with SF6.

The active radicals formed in the plasma rapidly react to form hydrogen cyanide, hydrogen and minor amounts of other chemical species including acetylene. The reaction is kinetically controlled and the synthesis gas is rapidly cooled in a water cooled heat exchanger (not shown) to less than 60° C. This is done to minimise the decomposition of hydrogen cyanide at the higher temperature, thus maximising the yield. In some instances it may be preferable to quench the hot gases by generating steam, in a waste heat steam generator (not shown).

The cooled gas is then contacted with a greater than 10% w/w solution of caustic soda to produce a greater than 10% sodium cyanide solution. The actual concentrations of caustic soda and sodium cyanide are not important and can be adjusted to the requirements of a particular end user.

Utility requirements include cooling water to the plasma torch unit and temperature quench heat exchanger, electric power and instrument air.

Rapid quenching of the synthesis gas from the plasma temperature to the neutralisation temperature of approximately 60° C. is performed to improve yield.

Theoretical free energy calculations for the system $CH_4$—$NH_3$—$N_2$—$H_2$—HCN at a temperature of 1200° C. and 1.5 atmosphere can be used to predict equilibrium gas phase concentrations and these are compared to those actually measured in the synthesis gas from a commercial Shawinigan reactor as shown in Table 1.

These calculations indicate that the hydrogen cyanide formed will preferentially decompose to hydrogen and nitrogen if sufficient temperature and time prevail. Rapid temperature quenching and rapid neutralisation of the acid gas is thus a requirement to maximise yield and minimise electric power consumption. This is achieved in the device by immediately neutralising the acid gas.

As shown in FIG. 3, the unit may be entirely contained within a container 350. The container 350 may have a length of about 10 metres. The container 350 would require only connection to raw materials, services and product delivery systems to be fully functional.

To aid mobility, container 350 may be fitted with one or more wheels 352.

Example 2

Figure 4:
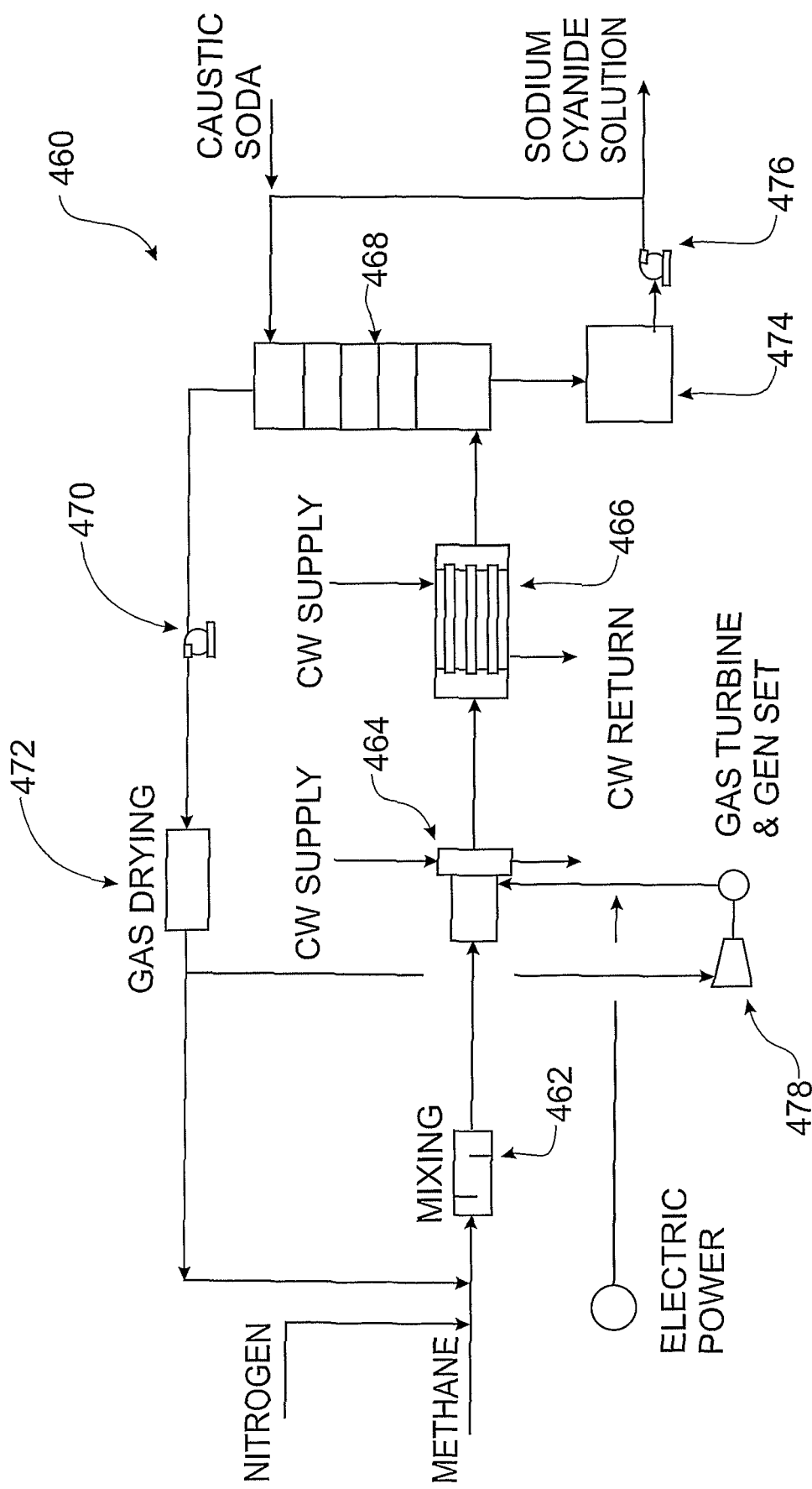
FIG. 4 shows a schematic diagram according to another embodiment of the apparatus of the invention. The apparatus depicted may be constructed by modifying a suitable conventional thermal plasma apparatus for toxic waste destruction.

FIG. 4 shows an apparatus 460 in which a commercially available modular plasma waste destruction unit has been converted to an onsite cyanide generation unit.

Key modifications to the waste destruction unit include provision for supply of natural gas and ammonia or nitrogen and their mixing in mixer 462; rapid quenching of the plasma synthesis gas as generated using plasma torch 464; absorption of cyanide in a caustic soda absorber 468; recycle of synthesis gas using a recycle gas compressor 470 and recycle gas dryer 472; collection of sodium cyanide solution in a day tank 474 for controlled dosing to the mill through a dosing pump 476; combustion of hydrogen in a gas fired turbine and generator set 478 for the generation of electric power; incorporation of appropriate start-up and shut down purge systems and process control system (not shown).

Of significance is that the complete plasma unit including transformers, plasma torch 464, quench cooler 466 and absorber 468 may be contained in a single 10 m trailer. Utilities and services including nitrogen generation, water cooling tower and off gas combustion and/or power generation may be located on a second similar size trailer.

Nitrogen input, methane input, cooling water (CW) supply to plasma torch, CW Supply to quench cooler, electric power input, CW return, caustic soda input and sodium cyanide output are also shown and labelled on FIG. 4 as NITROGEN, METHANE, CW SUPPLY, CW SUPPLY, ELECTRIC POWER, CW RETURN, CAUSTIC SODA and SODIUM CYANIDE SOLUTION, respectively. Also labelled and shown on FIG. 4 is the mixing that occurs at the mixer 462 as MIXING, the gas drying that occurs at gas dryer 472 as GAS DRYING and the generator set 478 labelled as GAS TURBINE AND GEN SET.

Example 3

Figure 5:
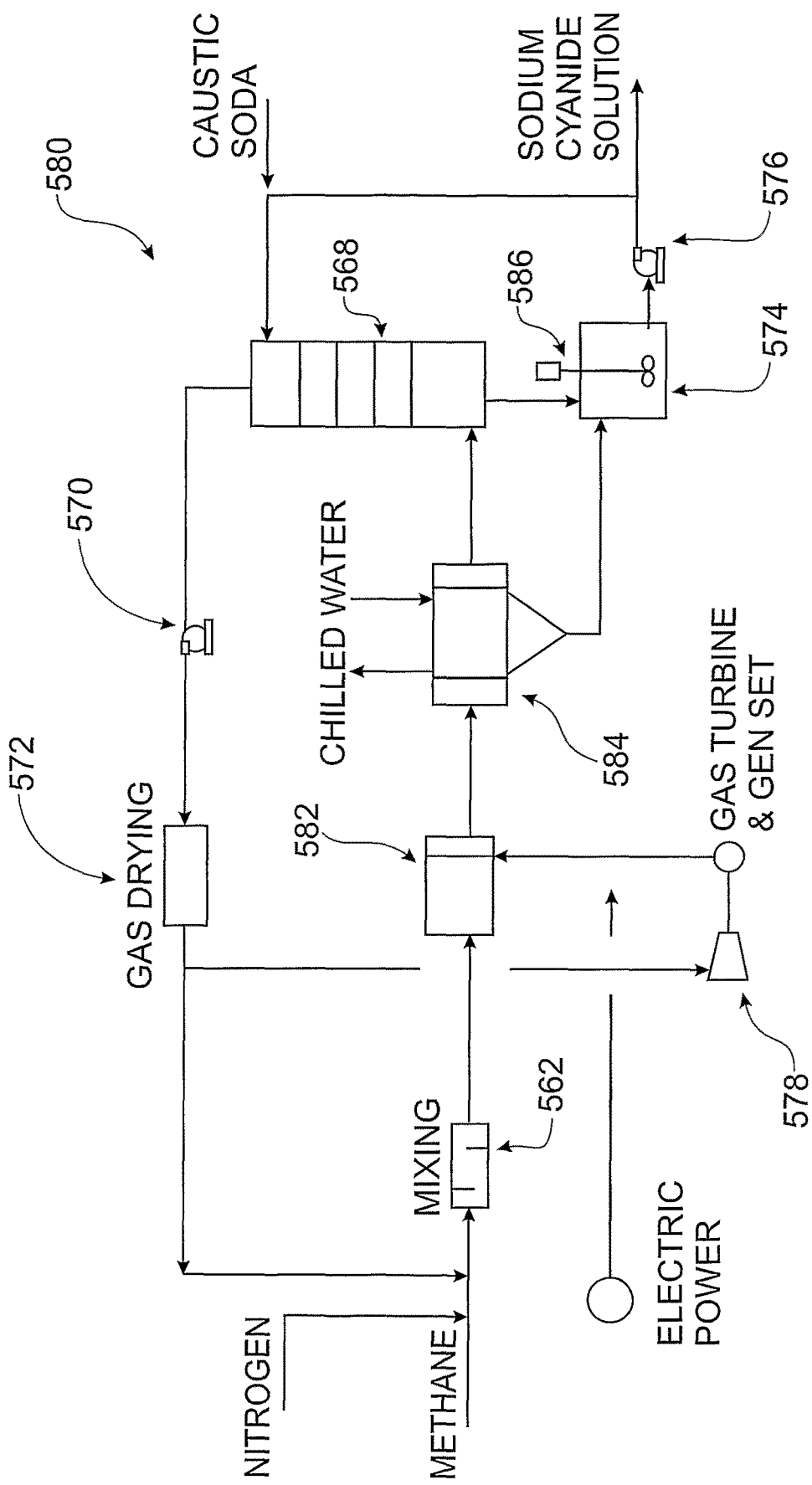
FIG. 5 shows a schematic diagram according to another embodiment of the apparatus of the invention using a cold plasma configuration.

FIG. 5 shows an apparatus 580 according to the invention in a cold plasma configuration. The essential difference compared to the thermal plasma configuration 460 is that the plasma is generated in a diffuse discharge or corona generated by corona generator 582. The bulk phase gas temperature is thus lower than that of a thermal plasma. In this embodiment the raw material natural gas and ammonia or nitrogen are combined with recycled synthesis gas and passed through a corona discharge zone.

Unlike the plasma torch used in the thermal plasma, the discharge zone consists of a large number of electrode plates (not shown). The plates are constructed of suitable materials such as quartz and carbon bonded together and are placed back to back with a small gap (typically 5 mm) between the electrode surfaces. The plates are built up as a sandwich with suitable spacers in between each pair of dielectric plates. Electrical connection to the plates is in parallel with an alternating power supply. Operating potential in the region is approximately 12000V. The plasma gas then passes to a quench heat exchanger.

A suitable catalyst such as SF6 is dosed into the circulating gas.

The gas cooler condenser or heat exchanger 584 is constructed to provide a large surface area to promote formation of hydrogen cyanide at the walls, where it can be shielded from degrading reactions and the reaction catalysed by suitable materials incorporated into the walls of the exchanger 584. The preferred cooling medium is chilled water, provided via a refrigeration system (not shown), although cooling water may also be used. The advantage of chilled water is that the hydrogen cyanide formed is immediately removed from the synthesis gas by condensation as liquid hydrogen cyanide which is collected and immediately reacted with caustic soda solution. The synthesised gas then passes to absorber 568 where the remaining hydrogen cyanide gas is reacted with a circulating solution of caustic soda to produce a greater than 10% w/w solution of sodium cyanide depending upon the end use requirement. The hydrogen cyanide depleted synthesised gas leaving the absorber is then dried and recycled to the discharge zone. The sodium cyanide solution produced is then dosed under controlled conditions to the mill.

A tank mixer 586 is provided to mix the cyanide in the tank 574.

Nitrogen input, methane input, chilled water supply and exhaust to the exchanger 584, electric power input, caustic soda input and sodium cyanide output are also shown and labelled on FIG. 5 as NITROGEN, METHANE, CHILLED WATER SUPPLY, ELECTRIC POWER, CAUSTIC SODA and SODIUM CYANIDE SOLUTION, respectively. Also labelled and shown on FIG. 5 is the mixing that occurs at the mixer 562 as MIXING, the gas drying that occurs at gas dryer 572 as GAS DRYING and the generator set 578 labelled as GAS TURBINE AND GEN SET.

Example 4

It was found that use of hydrocarbon source heavier than methane was complicated by the dissociation of heavier hydrocarbons to produce fine carbon black or soot. This material rapidly fouled the anode and cathode of the plasma torch, as well as blocking heat exchange surfaces and pipes. However, as mentioned above, many remote gold mine sites do not have access to natural gas and consequently the ability to use heavier hydrocarbons as the source is preferable.

The inventor found that use of propane or LPG was particularly suitable, especially because many mine sites already use LPG as a source of heating in their gold recovery circuits.

Example 5

It was found in the present invention that HCN production from propane was maximised and soot production minimised when the torch was operated to produce a bulk gas temperature of 1200-1400 C.

Figure 6:
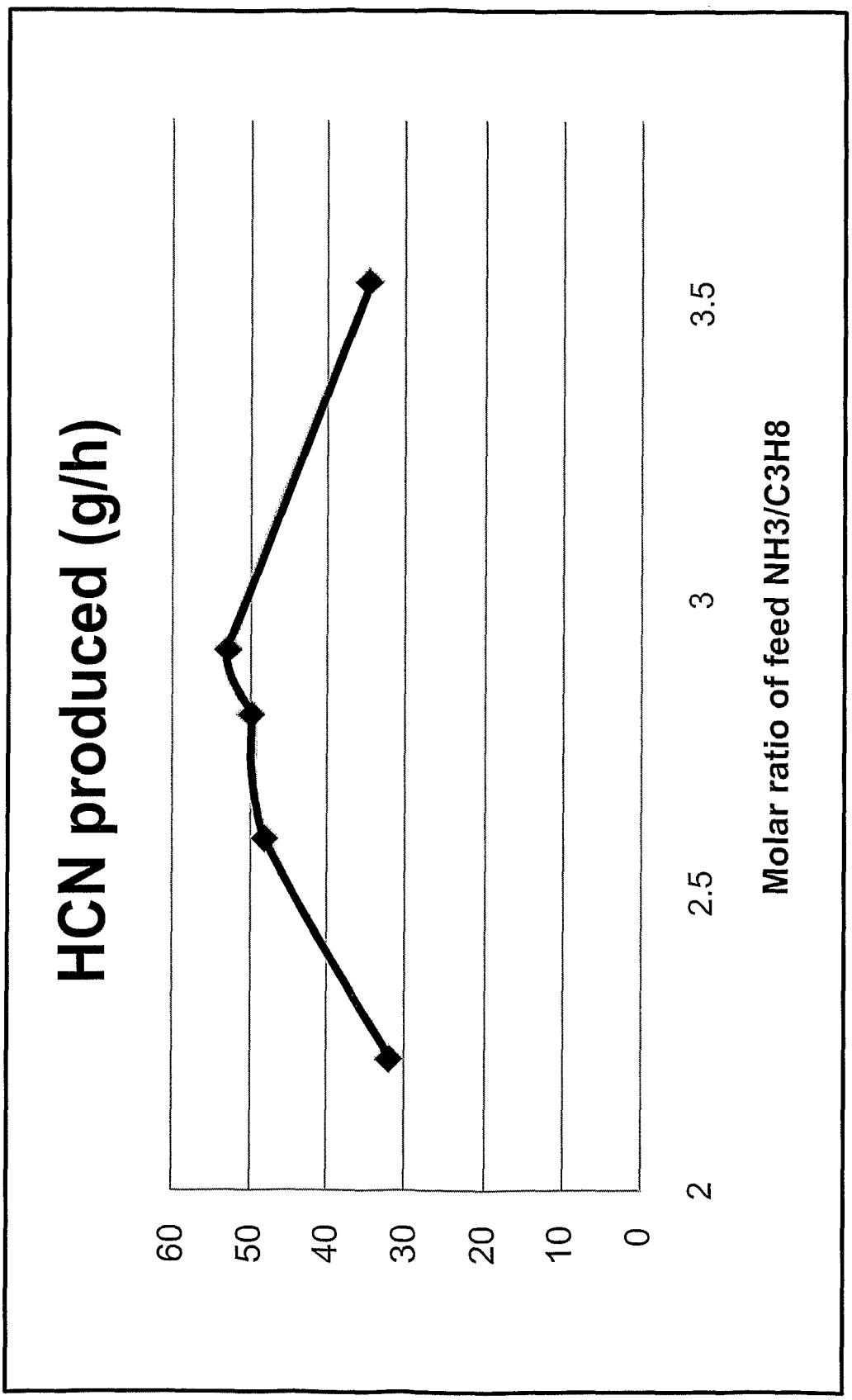
FIG. 6 shows a graph depicting the results of cyanide production with varying $NH_3:C_3H_8$ feed ratios.

It was further found that HCN production was maximised and soot production minimised if the molar ratio of $NH_3$ and propane feed was maintained between 2.5 and 3.0, see FIG. 6. This figures also shows that optimal results were obtained at a ratio of 2.85.

Example 6

It was also found that the point of propane addition in relation to the plasma gas was important to minimising soot production. While it was beneficial to pass both the carrier gas and ammonia through the arc, soot production was minimised if the propane was added to the high temperature gas immediately after the arc.

A distance of 10 mm between the arc and the propane addition point was found to be preferred.

Example 7

A key feature of the invention is the demonstrated ability to operate a small scale plasma torch on propane gas and ammonia at high chemical conversion and minimal soot production. This performance is demonstrated by the following example.

A non transferred arc plasma torch was fed with 38.9 g/h of ammonia gas, 36.1 g/h of propane and 3.5 L/min of argon carrier gas. A voltage of 14.8 V was applied across the anode and cathode to give a total measured power input of 1.78 kW. The measured HCN production was 45.4 g/h giving a 73% conversion of ammonia and a 68% conversion of propane. Concentration of HCN in the synthesised gas is 13.5% v/v (26% v/v net of the inert carrier gas).

The measured gas composition after neutralisation of the HCN produced in the above experiment was as shown in Table 2.

The inventors contribution has removed the need to transport, and transit-store dangerous solid and liquid sodium cyanide.

The inventors have made possible a rugged, modular, plasma based cyanide generation unit, that is capable of operation whether unattended or with only limited attendance. The invention may be fully self-contained except for process connections and utilities.

Also of significant advantage is that the invention can operate with a range of hydrocarbon and nitrogen sources and can be supplied with electric power from an external source, or can be capable of self generation of at least a part of the electrical demand.

The invention may provide onsite production of cyanide in a plasma based reaction system which has the following advantages:
  compact, reliable and robust;
  may be fully automated and may be capable of operating unattended, or with only limited attendance for extended time periods;
  simple to start-up and shut down;
  easy to maintain, with interchangeable components for major overhauls;
  does not require extensive training for staff to operate; and
  reduced wastage and risk of contamination during storage by enabling a just in time production of cyanide.

When used onsite for the gold industry, the invention's advantages include:
  a) the gold industry only requires a dilute cyanide solution and consequently it is not necessary to duplicate the expensive and technically complex concentration and solidification steps utilised in the centralised manufacturing facilities;
  b) a high purity cyanide solution is not required and consequently it is not necessary to remove impurities such as sodium chloride, sodium carbonate and sodium formate before adding the cyanide solution to the gold mill pulp;
  c) an added advantage of the preceding point is that no liquid cyanide effluent streams need to be produced from the unit, that would otherwise require expensive detoxification, (other than those normally produced by the gold mill);

d) it is not necessary to purchase high purity raw materials and cheaper caustic soda or lime solutions can be used, (alkaline mill pulps can also be used if desired);

e) cyanide solutions are manufactured for almost immediate use and consequently the loss of cyanide by natural decomposition reactions during transport and storage is minimised leading to increased overall yields;

f) there is no need to transport or store large quantities of highly toxic cyanide thus minimising the risk to communities and the environment and consequently addressing key aspects of the International Cyanide Management Code.

As mentioned above, the invention can use nitrogen separated from air onsite as the source of nitrogen, one of the advantages of this is that the need for the manufacture, transport, storage and handling of anhydrous ammonia is eliminated.

Furthermore, a plasma torch is readily adaptable to modular construction for onsite cyanide generation.

Throughout the specification the aim has been to describe the preferred embodiments of the invention without limiting the invention to any one embodiment or specific collection of features. It will therefore be appreciated by those of skill in the art that, in light of the instant disclosure, various modifications and changes can be made in the particular embodiments exemplified without departing from the scope of the present invention.

All computer programs, algorithms, patent and scientific literature referred to herein is incorporated herein by reference.

TABLE 1

Theoretical and measured product gas composition: Mole %

| Component | Feed to Plasma | Theoretical at equilibrium | Actual Measured |
|---|---|---|---|
| $CH_4$ | 5.6 | <0.0001 | 1.03 |
| $NH_3$ | 22.3 | 0.0005 | 2.07 |
| $N_2$ | 5.3 | 10.8 | 16.8 |
| $H_2$ | 66.9 | 88.03 | 58.9 |
| HCN | — | 1.3 | 20.6 |

TABLE 2

Measured gas composition after neutralization of the cyanide

| Component | Volume % |
|---|---|
| $H_2$ | 85.0 |
| $CH_4$ | 4.4 |
| $C_2H_6$ | 7.7 |
| $NH_3$ | 2.6 |
| $C_3H_8$ | 2.9 |

The invention claimed is:

1. A method for producing sodium cyanide, the method comprising the steps of:
   supplying a hydrocarbon source and a nitrogen source to an onsite plasma reactor and reacting the hydrocarbon source and the nitrogen source in accordance with a just in time sequence for a cyanide requirement; and
   removing cyanide synthesised inside the onsite plasma reactor to thereby produce the sodium cyanide, wherein the sodium cyanide is produced as determined by feed-forward regulation to maintain a minimum inventory of the produced sodium cyanide onsite, wherein the onsite plasma reactor is mobile and attachable to a transportable apparatus;
   wherein the just in time sequence is for a sodium cyanide requirement at a mine site for recovering, refining, purifying or treating a metal; and
   wherein the sodium cyanide requirement is monitored electronically and stored in a database as sodium cyanide requirement data and used to determine the sodium cyanide requirement in accordance with the just in time sequence.

2. The method of claim 1 wherein a distance between an arc of the plasma reactor and the hydrocarbon source addition point is in the range of 5 to 15 mm.

3. The method of claim 1 wherein a molar ratio of the nitrogen source and the hydrocarbon source is between 2.5 and 3.0.

4. The method of claim 1 wherein the nitrogen source is nitrogen gas.

5. The method according to claim 1 wherein the transportable apparatus is modular.

6. The method according to claim 1 wherein the sodium cyanide produced additionally comprises a hydrogen cyanide, a calcium cyanide, and/or a basic cyanide salt.

7. The method of claim 1 wherein the onsite plasma reactor is attached to a transportable apparatus.

8. The method of claim 1 wherein the nitrogen source is from air.

9. The method of claim 1 wherein a high cyanide concentration greater than 5% weight per weight is produced.

10. A method for producing sodium cyanide the method comprising the steps of:
    monitoring a sodium cyanide requirement of an onsite sodium cyanide utilizing system;
    supplying a hydrocarbon source and a nitrogen source to an onsite plasma reactor and reacting the hydrocarbon source and the nitrogen source in accordance with a just in time sequence for the cyanide requirement; and
    removing cyanide synthesised inside the onsite plasma reactor to thereby produce the sodium cyanide, wherein the cyanide is sodium, produced as determined by feed-forward regulation to maintain a minimum inventory of the produced sodium cyanide onsite, wherein the onsite plasma reactor is mobile and attachable to a transportable apparatus;
    wherein the just in time sequence is for a sodium cyanide requirement at a mine site for recovering, refining, purifying or treating a metal; and
    wherein the sodium cyanide requirement is monitored electronically and stored in a database as sodium cyanide requirement data and used to determine the sodium cyanide requirement in accordance with the just in time sequence.

11. The method according to claim 10 wherein the transportable apparatus is modular.

12. The method according to claim 10 wherein the sodium cyanide produced additionally comprises a hydrogen cyanide, a calcium cyanide, and/or a basic cyanide salt.

13. The method of claim 10 wherein the onsite plasma reactor is attached to a transportable apparatus.

14. The method of claim 10 wherein the nitrogen source is from air.

15. The method of claim 10 wherein a high cyanide concentration greater than 5% weight per weight is produced.

* * * * *